United States Patent
Gallick et al.

(10) Patent No.: US 7,995,721 B2
(45) Date of Patent: *Aug. 9, 2011

(54) SYSTEM AND METHOD FOR REMOTE ACCESS TO A TELEPHONE

(75) Inventors: Robert Lawrence Gallick, Phoenix, AZ (US); N. Thomas Peiffer, Jr., Phoenix, AZ (US)

(73) Assignee: Inter-Tel, Inc, Tempe, AZ (US)

( * ) Notice: Subject to any disclaimer, the term of this patent is extended or adjusted under 35 U.S.C. 154(b) by 1480 days.

This patent is subject to a terminal disclaimer.

(21) Appl. No.: 11/396,674

(22) Filed: Apr. 3, 2006

(65) Prior Publication Data

US 2006/0177016 A1    Aug. 10, 2006

Related U.S. Application Data

(63) Continuation-in-part of application No. 10/006,452, filed on Nov. 19, 2001, now Pat. No. 7,031,443.

(51) Int. Cl.
*H04M 11/00* (2006.01)

(52) U.S. Cl. .................. 379/90.01; 379/88.17; 370/401; 455/417

(58) Field of Classification Search ............... 379/90.01, 379/88.11, 88.17, 419, 93.14, 142.07, 201.01, 379/211.02, 93.25, 93.01, 93.02; 370/352, 370/271, 286, 252, 232, 389–404

See application file for complete search history.

(56) References Cited

U.S. PATENT DOCUMENTS

| | | | |
|---|---|---|---|
| 5,572,643 A | 11/1996 | Judson | |
| 5,651,054 A | 7/1997 | Dunn et al. | |
| 5,764,639 A | 6/1998 | Staples et al. | |
| 5,870,744 A | 2/1999 | Sprague | |
| 5,905,776 A | 5/1999 | Shaffer | |
| 6,084,952 A | 7/2000 | Beerman, Jr. et al. | |
| 6,141,545 A | 10/2000 | Begeja et al. | |
| 6,212,177 B1 | 4/2001 | Greene et al. | |
| 6,285,747 B1 | 9/2001 | Haack | |
| 6,301,339 B1 | 10/2001 | Staples et al. | |
| 6,359,892 B1 | 3/2002 | Szlam | |
| 6,393,017 B1 | 5/2002 | Galvin et al. | |
| 6,542,475 B1 * | 4/2003 | Bala et al. ..................... | 370/271 |
| 6,571,094 B1 | 5/2003 | Begeja et al. | |
| 7,120,140 B1 * | 10/2006 | Dylag et al. .................. | 370/352 |

FOREIGN PATENT DOCUMENTS

| | | |
|---|---|---|
| EP | 0880255 A3 | 3/2001 |
| JP | 10307794 | 11/1998 |
| WO | WO 00/69156 A1 | 11/2000 |
| WO | WO 01/35616 A2 | 5/2001 |
| WO | WO 01/78343 A2 | 10/2001 |

* cited by examiner

*Primary Examiner* — Melur Ramakrishnaiah
(74) *Attorney, Agent, or Firm* — Michelle Whittington, Esq

(57) ABSTRACT

A remote access system between a remote client and an office telephone via a packet network on a point-to-point basis is provided. The office center includes a web server having a web page stored thereon and a PBX system. During a remote session, incoming communications to the PBX continue to flow to the office telephone and then are routed to the remote client. The remote client is able to view, manage and control the events as if the worker was at the office. Alternatively, the office telephone may establish a remote session with the remote client on a point-to-point basis such that all communications to the remote client flow to the office workstation. Additionally, the office telephone and remote client may have connectivity devices coupled to them so data from the connectivity devices can be viewed, managed and controlled at a remote location.

13 Claims, 8 Drawing Sheets

SYSTEM AND METHOD FOR REMOTE ACCESS TO A TELEPHONE

CROSS REFERENCE TO RELATED APPLICATIONS

The present invention is a continuation-in-part that includes subject matter related to and claims priority from U.S. patent application Ser. No. 10/006,452 filed on Nov. 19, 2001 now U.S. Pat. No. 7,031,443, under the same title and incorporated herein by reference.

FIELD OF INVENTION

The present invention generally relates to a system and method for remote access to a telephone, and in particular, to a web-based system for providing remote access to a multi-function telephone.

BACKGROUND OF THE INVENTION

Advances in digital and personal communications, the explosive popularity of the Internet, and an expanding global market have contributed to a "mobile workforce." The mobile workforce attempts to "stay in touch" with their office telephone and system by using numerous communication devices such as, cellular phones, laptops, pagers, personal digital assistants and personal computers. The dilemma is that currently no single device can meet all the needs of the mobile worker and therefore, the mobile worker is forced to carry or operate multiple "stay in touch" devices. It is clear there exists a need for workers to easily access and control multiple desktop telephone functions at the office while in remote locations.

Various attempts have been proposed to provide mobile workers with remote access to the office. One such attempt by Ward et al. is disclosed in European application number EP 98 30 4009. Ward describes a dedicated gateway associated with an IP network, a switching system and a computing device. The remote user is able to connect to the main office through the dedicated gateway and enjoy a "virtual main office desktop environment."

Another attempt, disclosed in U.S. Pat. No. 5,764,639 by Staples et al., uses the public switched telephone network ("PSTN") to establish a connection between a remote telephone and a dedicated virtual presence server ("VPS") at the main office. The VPS provides telephone functions by connecting the VPS to the on-premis private branch exchange ("PBX") system via additional standard telephone ports. The remote user loses their individual class-of-service properties as defined in the PBX and must follow the permissions defined within the VPS.

Yet another attempt, disclosed in U.S. Pat. No. 5,905,776 by Shaffer uses a coordinator module at each end of the connection made between a remote telephone and a PBX. The remote user is allowed to move between more than one telephone and the system can move its services to each as required.

As more telephone users obtain everyday access to devices like portable computers, cell phones and personal digital assistants ("PDAs"), and have one or more personal computers in their homes, the requirements for remotely using desktop facilities "back at the office" increase and change dramatically. For example, it would be desirable to access a desktop multifunction telephone in the office from a remote location using a variety of personal communication devices, and not simply a telephone or personal computer.

Moreover, recent developments in hand-held communication devices permit the user to quickly access the Internet via a standard web browser stored on the device. In this manner, these portable communication devices include a display and input means for viewing and browsing on the Internet. Wireless Application Protocol ("WAP") provides the universal open standard which enables mobile users to easily access web-based interactive information services and applications from their mobile devices. WAP is designed to deliver content in the optimal format for display on thin mobile devices, such as cellular phones. In addition, WAP-compliant services and applications are designed to run over a variety of network types, both current and future. Thus, it would be desirable to utilize a WAP-compliant personal communication device, or the equivalent, to access, control and view multiple desktop functions at the office from a remote location in a real-time internet environment.

SUMMARY OF THE INVENTION

The invention provides a system and method for remote access to a telephone and includes a variety of remote clients capable of Internet communication coupled to an office information center housing the telephone.

In one embodiment, the remote access system includes a communication device coupled to an information center over a web-based channel to cause a remote access session. During the session, a telephone within the information center is rendered inoperable and all information normally received to the telephone from the center's PBX system is routed to the communication device.

In another embodiment, the system provides remote voice mail retrieval from a remote device to an information center. A messaging server of the center receives, stores and causes the textual display of voice mail messages on a communication device of the center. During a remote access session, the remote device accesses a website stored on a web server of the center and receives the textual display. Function keys located on the remote device are enabled to manage the control of the voice mail.

In yet another embodiment, the system provides a remote access session between a web-compliant portable communication device and an office telephone via an Internet connection. An Internet Protocol Controller (IPC) coupled to the PBX system of the office translates telephone-related information into packets for transmission to the portable device. The portable device receives telephone calls from the PBX system in real-time.

In one embodiment of a method for remote access, a communications link is established between a remote client and the world-wide-web. A web page is displayed on the client and a link to a port of the PBX system of an office is established. A web page model of a telephone within the office is constructed representing the functions available on the telephone. Those functions are disabled on the office telephone and enabled on the remote client. Incoming calls are routed to the remote client until the link is terminated. Upon termination, the port between the telephone and the PBX system is restored and any alterations to the functions of the telephone made during the session are updated.

In still another embodiment, the system provides a remote access session between a remote client and an office telephone whereby the office telephone includes web services capabilities within the telephone itself or directly coupled thereto.

In another embodiment, the system provides a remote access session between an office telephone and a remote client on a point-to-point basis. The office telephone includes web services capabilities and the remote client includes web browsing capabilities. Optionally, the remote client may include or be coupled to connectivity devices such as surveillance systems. The connectivity devices may be accessed, monitored and controlled from the office telephone by using the web browsing capabilities in the office telephone and web services capabilities in the remote client. The remote client may also be coupled to additional remote clients such that the office is able to establish communications to the additional remote clients.

BRIEF DESCRIPTION OF THE DRAWINGS

These and other features, aspects and advantages of the present invention may be best understood by reference to the following description taken in conjunction with the accompanying drawings in which like numerals represent like elements.

DETAILED DESCRIPTION

The subject matter is particularly suited for use in connection with customer-owned switching systems to extend control of desktop telephones to employees working from remote locations, and vice versa. As a result, exemplary embodiments are described in that context. It should be recognized, however, that such description is not intended as a limitation on the use or applicability of the present invention, but is instead provided merely to enable a full and complete description of embodiments. For example, while the subject matter is suited for use with customer-owned switching systems, it is not required that the switching system be notified of the remote session or behave any differently during the session.

In general, particular embodiments utilize web-based technology to provide mobile users with remote access to their office telephone from a wide variety of personal communication devices. In this manner, the entire functionality of a multi-function desktop telephone may be duplicated and stored on a web server computer.

Mobile workers are able to access a web page using a web-compliant personal communication device to read, update, control and operate their desktop telephone as if they were in the office.

Additionally, remote clients may be accessed from the office telephone and control of the remote client is extended to the office location. As will be discussed below, the remote client may include or be coupled to additional devices such that media and/or voice from these additional devices may be accessed, viewed, managed and monitored at the office location.

Figure 1:
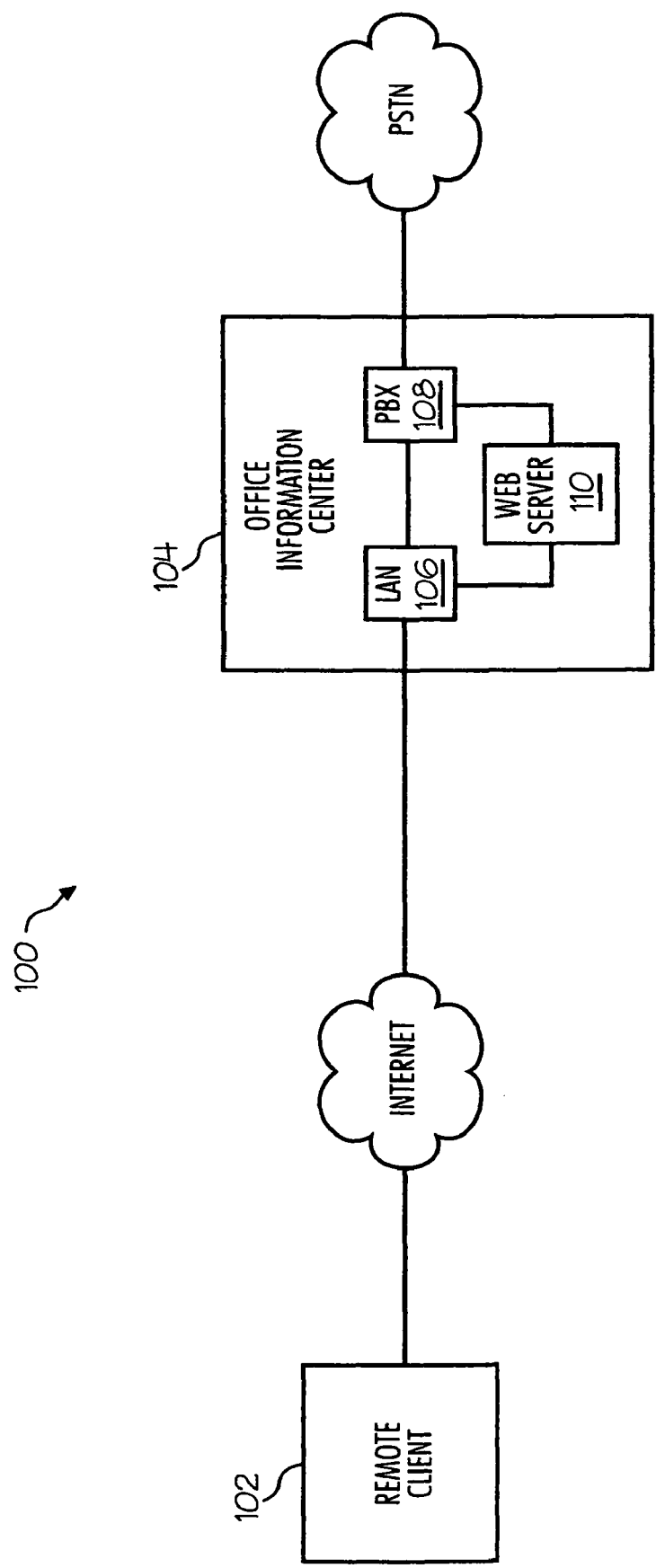
FIG. 1 illustrates in simplified block format, an Internet-based architecture in accordance with the present invention.

FIG. 1 is a simplified block diagram illustrating a preferred Internet-based architecture that can be used to implement a remote access system 100 in accordance with the present invention. Exemplary remote access system 100 includes a remote client 102 in two-way communication with an office information center 104. Used herein, "remote client" may include any communication device, portable or stationary, wireless or wired, capable of two-way communication with the office information center. Examples of suitable remote clients include, but not limited to, a cellular phone, laptop or portable computer, personal digital assistant ("PDA"), fixed personal computer, messaging device, on-premise wireless gateway system, and various other communication devices. It should also be appreciated that used herein, "remote client" may actually comprise one or more coupled devices even though depicted on the figures as a single block or unit.

In the preferred embodiment, as shown, the communication channel between the remote client and the office information center is the Internet, or other packet network. In this sense, remote client 102, of the preferred embodiment, includes a web-compliant personal communication device suitably capable of processing web pages and multimedia information (i.e., text, graphics, video and/or audio) and may include a remote multimedia device having web-client software, an audio processor, a visual display, and/or an audio transducers. Preferably, remote client 102 is of a type capable of establishing a packet communication link with office information center 104 via the Internet using a common protocol, e.g., Hyper-Text Transfer Protocol (HTTP).

Office information center 104 may be, for example, at the office location where the remote user desires to be connected. Used herein, "office information center" may be referred hereafter as "office" and include any entity such as the main office, corporate office, business, or any other type of office to which the remote user desires to access, control, view and operate a multi-function telephone, or the like, located therein. In addition, used herein, "office information center" may include a physical or non-physical structure and any necessary connections, routings, apparatus and the like normally associated with an "office", many of which will be discussed below. In this embodiment, the remote client establishes a link to a LAN (local area network) 106 of the office information center 104 via an Internet connection. The remote device then uses the office LAN facility to couple to a PBX (public branch exchange) system 108, or network thereof, using any suitable link capable of carrying both telephone control signals and communications channel signals. In one specific embodiment, the information and communications ("events") associated with any attached desktop telephone (not shown) can be made available to the link for transmission over web server 110, through the network, and to remote client 102.

In one embodiment, incoming and outgoing calls to office information center 104 are received over a standard PSTN (public switched telephone network). In this sense, calls made to a mobile worker over the PSTN are received at PBX 108 in a like manner as if the worker was in the office. Similarly, calls made from the mobile worker (remote client 102) may be placed over the same PSTN whether the worker is in the office or in the field.

Figure 2:
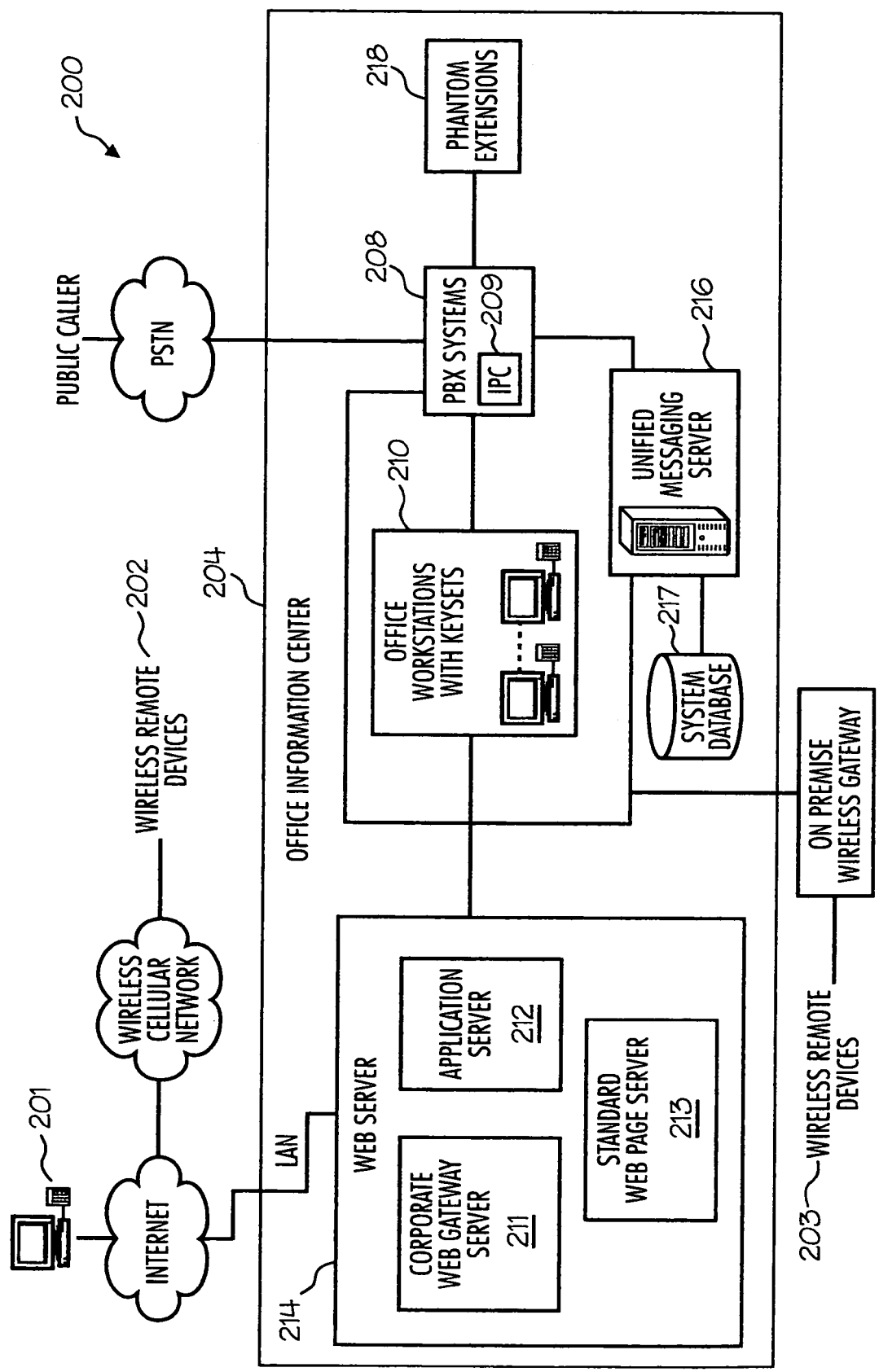
FIG. 2 illustrates an exemplary network configuration in accordance with the present invention.

FIG. 2 illustrates an exemplary network configuration in which a remote access system in accordance with the present invention can function and operate. The remote access system (hereinafter, referred to as the "system") 200 includes a remote client 201-203 and an office information center 204. Remote client 201-203 may include any of the communication devices previous described for remote client 102 or any other suitable communication device capable of two-way communication between the office information center 204. Remote client 201 may be, for example, a stationary personal computer (PC) having a display and input means (e.g., a keyboard or "touch screen") in a location remote from the office. In one particular embodiment, the PC is linked to a keyset that uses an Internet protocol such as TCP/IP to connect to the Internet. Used herein, "keyset" may include telephone and appliances performing telephone-like functions, having an audio-transducer or the like, such as a handset or headset, keypad and display, and other multi-function desktop telephone functions. In this embodiment, the link between the remote client, e.g., a PC linked to a keyset, and the office information center may be directly to an Internet Protocol Card (IPC) 209 of a PBX system 208. This feature will be described in more detail below. In another particular embodiment, the PC includes suitable software to display a "soft phone" on the screen. In this manner, the PC is not linked to an actual keyset, but rather, uses software installed on the PC that simulates a telephone. The remote user is able to place and receive calls by activating the image on the screen by key stroke, mouse or touch screen.

In another embodiment, remote client 202 may include a wireless remote communication device. Preferably, remote client 202 has a display and input means and includes a web or "microbrowser" with suitable hardware and/or software to effectuate connection to the Internet. Suitable examples for remote client 202 include, but not limited to, personal digital assistants (PDAs), cellar or mobile phones, wireless headsets, personal computers and portable computers. As shown, wireless remote devices, such as remote client 202, typically connect to a wireless cellular network, the operation of which is beyond the scope of this invention and will not be described in detail. It should be appreciated that, although not shown or described, additional connections, links and/or adapter interfaces may occur between the wireless remote client and the Internet such as connection to a cellular base station or web translation server.

In yet another embodiment, remote client 203 may include a wireless remote device in communication with a on-premise wireless telephone gateway. For example, in this embodiment, it may not be necessary to connect to the Internet or a LAN. Rather, the on-premise wireless system may connect directly, or near directly, to the PBX system 208 of office information center 204. Various types of on-premise systems exist, such as the INT 2000 system by SpectraLink™, and are typically used in large coverage area office buildings to directly interconnect employees and workers while the workers are roaming around within the office building or just outside the building. Preferably, remote client 203 includes a display and input means for accessing, viewing and operating a multi-function telephone located within the office. When the employee leaves the workstation area, the "roaming worker" may activate a wireless remote device (i.e., remote client 203) and thus continue to receive, control and view the keyset of the desktop telephone as if he was still at the workstation.

In another embodiment, remote client 203 includes an on-premise wireless telephone having web-browsing capabilities. In this case, the roaming worker activates the on-premise wireless and is able to perform all the functions as mentioned in the previous embodiment, except that the remote client links to the office information center via an Internet connection.

With continued reference to FIG. 2, in the preferred embodiment, the mobile worker using a suitable remote client (e.g., remote device 201 and 202) accesses the Internet in a variety of methods which are well known in the industry and beyond the scope of this invention. In addition, it should be appreciated that numerous links, routing and connections may occur after the mobile worker has connected to the Internet in routing the connection to the office information center. In one particular embodiment, if access is granted to the mobile worker, a connection is made to a LAN of office information center 204. It should be realized that various other networks may be equally used, such as W-LAN (wireless local area network), intranet, a telephone network and the extranet.

The office information center 204 includes a PBX system, or the equivalent, 208 and a web server system 214. PBX system 208 includes various interfaces, e.g., an Internet Protocol Card (IPC) 209, as needed for communication with the Internet, PSTN and other wireless and/or wired embodiments which will be discussed below. PBX systems are generally well known and provide telephone and messaging services as needed to multiple office users (i.e., keysets). Provided services typically focus on the delivery of external and internal telephone calls to a commercial business. In general, PBXs are office-based telephone exchanges having special functions directed towards business users. Modern PBXs also provide integrated voice mail, hands free intercom calls, call center functions, complex system networks, and additional features using external computer control. Audio and control paths are extended to the keysets from a PBX switching complex using wiring connections. Local users may also be connected to the PBX using headsets and a variety of wireless devices for use while on the premises. In a similar sense, the PBX is any customer-owned switching apparatus that is used to connect real-time voice or multimedia communications from user-to-user, regardless of the technology employed, such as time division multiplexing, packet switching, optical switching, or any combination thereof.

Web server 214 generally includes a computing device capable of providing a suitable website or other Internet-based graphical user interface which is accessible by the mobile workers. The term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like. The remote client couples to web server 214 (having the web protocol software stored thereon) and typically communicates using standard Hyper-Text Transfer Protocol (HTTP) web protocol. Web server 214 is shown as a separate block on FIG. 2, however it should be realized that web server 214, including some or all its functionality, may be integrated within the office telephone itself (e.g., office workstations 210).

In one embodiment, web server 214 includes one or a combination of, a corporate web gateway server 211, an application server 212, and a standard web page server 213, or any equivalents thereof. In one particular exemplary aspect of the present invention, web server 214 includes an authentication or security system comprising a conventional computer security system commonly used to validate remote users. In this sense, users that access remote information on a confidential basis via web technology typically communicate with the office via a secure web server. In general, this exemplary aspect of the present invention does not require any additional hardware or software to authenticate a mobile worker and simply relies on an office's existing security systems. It should be appreciated that an authentication system may not be included in some remote access systems and is merely provided herein as one exemplary embodiment.

Corporate web gateway server 211 includes hardware and software to, among other purposes, store a corporate web page on the Internet. A web hyperlink may be directed to a web page of the office via an appropriate Internet address, for example, by using a URL (uniform resource locator). This invokes a security protocol on server 211 and the mobile worker may be asked to input a user name and/or password. Alternatively, the mobile worker's authentication data may be stored on the remote client and unbeknownst to the user, the data will be passed to the server. In one embodiment, server 211 receives the authentication data, verifies the data, and writes a code into a file in the remote client session called a "cookie." The cookie provides a security clearance identifier that allows the mobile worker to move to other web servers within the office information center without having to re-enter a password.

In another embodiment, an application server 212 may include hardware, such as an appropriate database, and software to authenticate the mobile worker. For example, instead of authenticating the user with a password and user name, the server may retrieve a unique device number of the remote client and grant access to the client's pre-registered user. Additionally, application server 212 may include various other applications stored thereon, aside from authentication software, which may used to facilitate remote connection and control.

In yet another embodiment, a standard web page server 213 may be used to facilitate access to PBX system 208 using a LAN connection. In this sense, server 213 preferably communicates with an IPC (Internet Protocol Card) 209 of PBX system 208 and includes software to perform a web translation of the connection by creating virtual abstractions of the keyset ports provided within the IPC. This operation will be described in more detail below.

Office information center 204 may also include one or more office workstations with keysets 210. The office workstations may include a computing device, such as a stationary or portable personal computer having a memory, database, display and input means. Additionally, each workstation may be coupled to a keyset (e.g., multi-function desktop telephone). Used herein, "workstation" shall generally include a computing device coupled to or in communication with a keyset. While the worker is at the office, the workstation is functional and as shown in FIG. 2, may be in communication with various other systems within office information center 204. For example, each workstation preferably has connectivity to both PBX system 208 and web server 214.

In one embodiment, office information center 204 may include one or more phantom extensions 218 in lieu of, or in combination, with workstations 210. Phantom extensions are often times used for workers that do not need a workstation and thus there does not exist a physical keyset assigned to a phone number or extension. These extensions do not correspond to physically equipped system ports and are activated when remote access is in use or if dialed by other PBX users. These extensions require no hardware resources and provide a means to assign directory numbers, class of service, group member assignments, and access rights to these extensions that really only exist for features like remote usage. When the remote unit is not using the phantom extension, incoming calls may be sent to voice mail, callers can view Do-Not-Disturb indications or other status information that was set up by the remote user while the connection was active. However, the phantom extension typically cannot originate a call without the remote user being active. Physical connections to phantom extensions may be set up using a block of IP addresses that are available in IPC 209 for remote users to share. These are dynamically allocated to support varying demand patterns.

The preferred system and method of the present invention utilizes the Internet as an accessible and widely available communication channel for remote clients to "stay in touch" with their office telephone and system, and for office workers to "stay in touch" with their remote clients and systems. In this manner, the system of the present invention employs existing voice messaging systems, keysets, PBX systems and communication links between the same, and typically does not require extensive additional hardware and/or software to implement. Provided below are two exemplary embodiments for accessing PBX system 208 within office information center 204 over the Internet. It should be noted that regardless of the type of remote client and network (i.e., wired or wireless) used, either of the following embodiments may be employed. Of course if an on-premise remote device similar to remote client 203 is used, connection over the Internet may not be needed. The first embodiment includes access through a unified messaging server 216 (and standard web server) and the second through a standard web server and IPC 209.

Access to PBX System Via Unified Messaging Server

In one embodiment, remote access between a remote client and PBX system 208 of office information center 204 is through a unified messaging server (UMS) 216. UMS 216 includes hardware and software configured to manage and display voice mail messages. Moreover, UMS 216 acts as a "bridge" to one or more system databases 217 for storing data pertaining to voice mail messages. UMS 216 is configured to provide a visual description of voice mail messages (i.e., cause the display of the message's envelope) and similar functions available on a multifunction keyset. In this sense, there is a communication link between UMS 216 and PBX system 208.

Referring again to FIG. 2, in one embodiment, UMS 216 provides web server capability within office information center 204. The web server presents readable data to a remote client from PBX system 208. It should be noted that web server capabilities may be illustrated in FIG. 2 as a separate block 213 and generally block 214, but this is not intended to be a physical limitation on the system. In other words, the functions of an appropriate and suitable web server may be illustrated as a separate block in the accompanying diagram(s), but the capabilities may be physically located in a stand-alone server coupled to UMS 216 or within UMS 216.

In one particular embodiment, an OAI (open architecture interface) link between USM 216 and the office telephone system (i.e., PBX system 208) is established. This communication link provides the exchange of control information with the web server to transfer data used to support function keys and indicators for one or more keysets. In effect, the OAI link permits the same information that is available at office workstations 210 to the remote client via the web server connection. Thus, once the remote client is connected (this operation will be described in detail below), audio information from a caller, e.g., a public caller over the PSTN, may be linked using a separate analog or digital channel coupled to the remote client via transmission facilities commonly used with the Public Switched Telephone Network (PSTN).

Multiple channels of audio information may also be made available within the link between PBX system 208 and UMS 216 (including a web server). These channels are normally used to process voice mail messages for the system users, but in the case of a live remote user phone call, these channels may also be used to remotely conduct voice communications with any port on PBX system 208. As an option, to make this audio information more efficiently available through the web server, a compression process, e.g., commercially available compression standard G.729 or the like, may be used to reduce the bit rate required for the remote transmission, hence reducing the amount of transmission bandwidth consumed by the bi-directional communications signal to the remote client.

Figure 4:
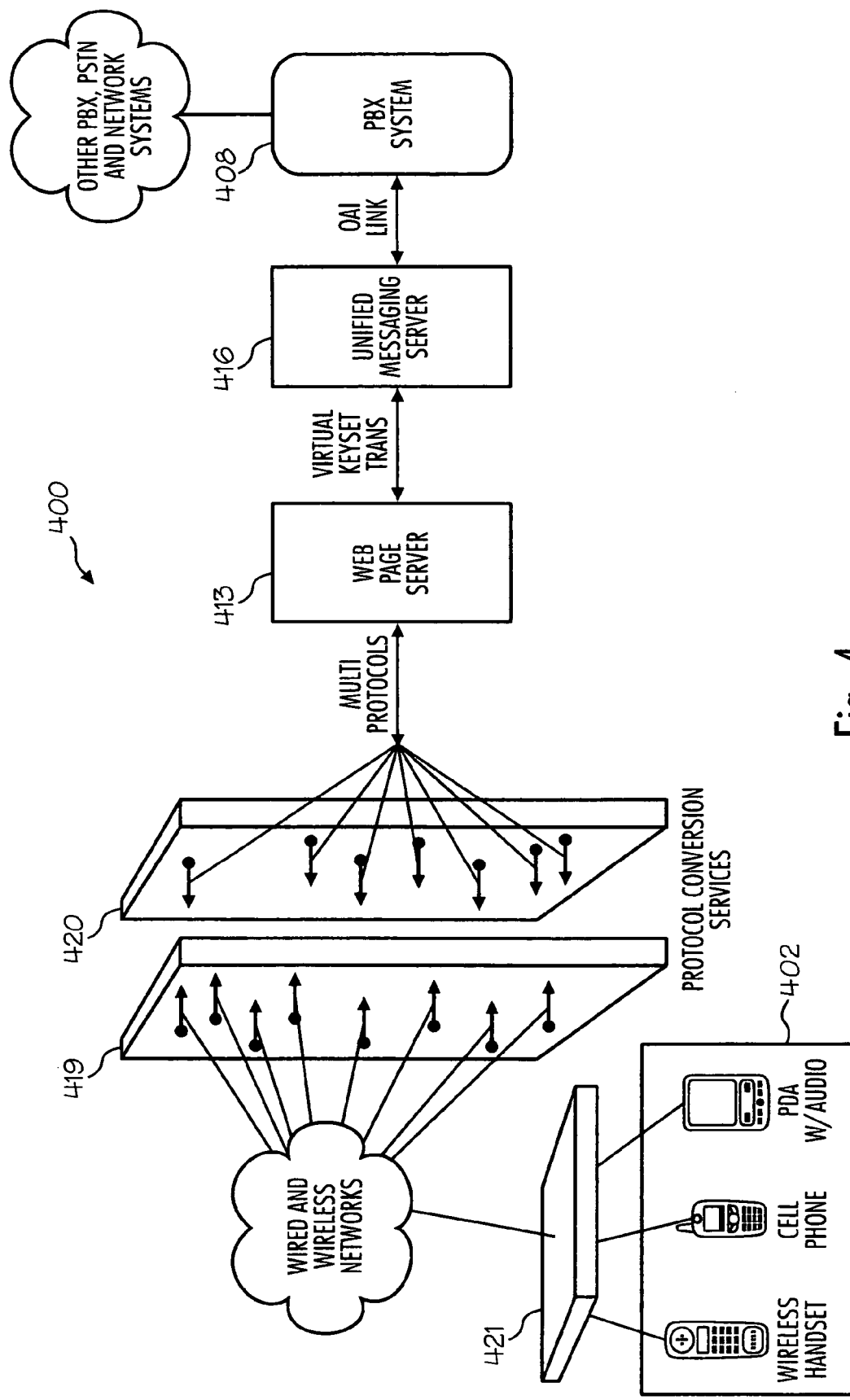
FIGS. 4 and 5 illustrate exemplary connection and translation systems in accordance with the present invention.

FIG. 4 illustrates an exemplary connection and translation system 400 suitable for operation of remote access from a remote client 402 to a PBX system 408 via a Unified Messaging Server (UMS) 416. Remote device 402 may include any of the previously mentioned remote devices both wired and wireless. PBX system 408 and UMS 416 may include systems substantially similar to previously described PBX system 208 and UMS 216. The connection between PBX system 408 and UMS 416 may be an OAI link as previously described. A web page server 413 in communication with UMS 416 may be an integral part of UMS 416 or, alternatively may be located in another physical structure. Web page server 413 may be similar in function to previously described web page server 213. Web page server 413 is configured to present data representing a plurality of keysets (or phantom extensions) associated with the office.

Translation system 400 further includes protocol conversion services 419 and 420 which are typically implemented as software-based products. For example, conversion services 419 and 420 may be suitable software products stored on web page server 413 for performing protocol conversions from an IP-based protocol to HTML or similar web-based protocol (e.g., 420 to 419) and vice versa (419 to 420). In other words, conversion service 419 may suitably convert data to HTML protocol and conversion service 420 may suitably convert data to IP-based protocol.

With continued reference to FIG. 4, translation system 400 also may include conversion software 421 for converting data between the network and remote device 402. In one embodiment, the network is the Internet and conversion software 421 is preferably implemented in a web browser of remote device 402, e.g., a Java script, that is downloaded at the beginning of a communication session. Once this script becomes operational, it binds to a separate IP port on UMS 416. The IP port performs a real-time communication link between remote device 402, PBX system 408 and public callers from outside PBX, PSTN and other network systems. The link is generally with the OAI link that is associated with the keyset of interest. The process and dedicated port remains active until the connection between the remote device is terminated.

Access to PBX System Via Web Server and IPC Card

In another embodiment of the invention, remote access between a remote client and PBX system 208 is through a direct web server connection to the PBX system. For example, access to the station ports of PBX system 208 may be made not by using an OAI connection, but rather by connecting the LAN port of a specially designed station set adapter, e.g., IPC 209, equipped within the PBX chassis. IPC 209 electrically connects to the PBX back plane and suitably translates voice channel and call control information available therein to packets for transmission on the LAN. The IPC may be of a type described in U.S. Pat. No. 6,829,249 entitled "Voice-Over Internet Protocol" by Ray et al, the contents of which are incorporated herein by reference. In addition, IPC 209 provides two-way transmission of both voice and call control for a group of PBX stations using one packet stream, with the audio portion of the stream encoded in the interface card using a standard like G.729. By associating a web server containing protocol conversion software with the PBX LAN port, it is possible to translate each of these stations into a virtual appearance using, not just one (i.e., G.729), but several possible protocols.

Referring again to FIG. 2, the LAN connection with web server 214 and IPC 209 is shown. The LAN provides the physical access point to support the IP packet stream with web server 214. Part of the control information present on this packet stream is equivalent to the information flowing over the OAI link to UMS 216. However, in the present embodiment, the OAI information is preferably embedded in the information flow from IPC 209 and therefore is made available for processing in the web server, e.g., standard web page server 213. The present embodiment provides an efficient PBX connection approach because the audio messages are typically already encoded. Therefore, there is no need to specially encode audio from messages or trunks as may be needed in the previous embodiment.

Figure 5:
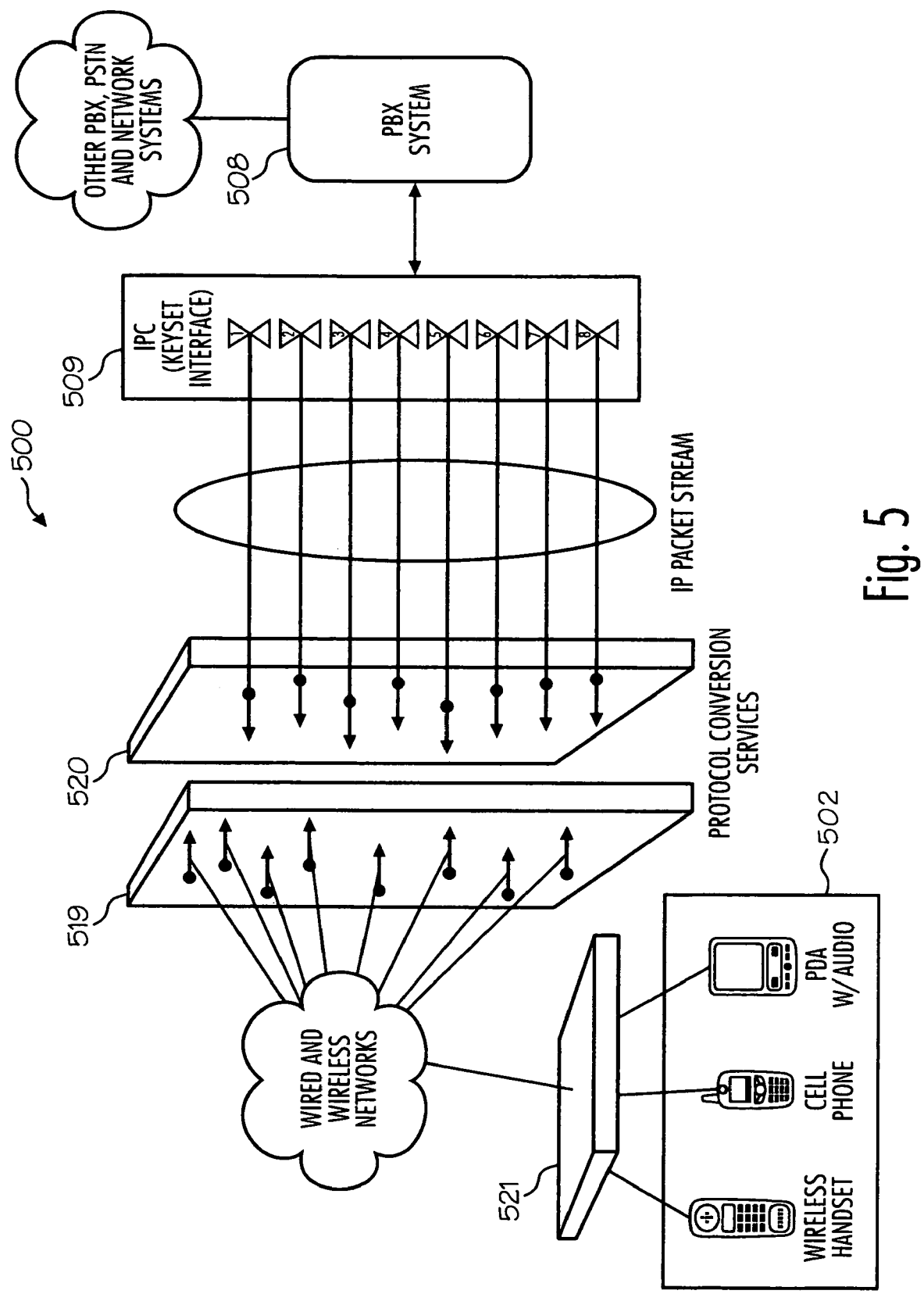

FIG. 5 illustrates an exemplary connection and translation system 500 suitable for operation of remote access from a remote client 502 to a PBX system 508 via a IPC 509. Remote device 502 may include any of the previously mentioned remote devices both wired and wireless. PBX system 508 and IPC 509 may include substantially similar systems as previously described PBX system 208 and IPC 209. As shown, IPC 509 includes independent and parallel keyset appearances for keysets 1-8 associated with the office; however, this is merely exemplary and it should be appreciated that the number of keysets represented by the interface is limited only by the capacity of the hardware and/or software.

Translation system 500 further includes protocol conversion services 519 and 520 which are typically implemented as software-based products. For example, conversion services 519 and 520 may be suitable software products stored on a web page server (not shown) for performing protocol conversions from an IP-based protocol to HTML or similar web-based protocol (e.g., 520 to 519) and vice versa (519 to 520). In other words, conversion service 519 may suitably convert data to HTML protocol and conversion service 520 may suitably convert data to IP-based protocol.

Translation system 500 may also include conversion software 521 for converting data between the network and remote device 502. In one embodiment, the network is the Internet and conversion software 521 is preferably implemented in a web browser of remote device 502, e.g., a Java script, that is downloaded at the beginning of a communication session. Once this script becomes operational, it binds to a separate IP port on IPC 509. The IP port performs a real-time communication link between remote device 502, PBX system 508 and public callers from outside PBX, PSTN and other network systems. The process and dedicated port remains active until the connection between remote device 502 is terminated.

Referring again to FIG. 2, the systems and methods of the present invention provide a means for complete control of a multi-function keyset (e.g., keyset 300) from a remote client. In the preferred embodiment, remote access is through a web-compliant remote device and through the Internet. In this manner, a mobile worker connects to the Internet using a web-compliant remote device and is routed to a web page provided by a web server within office information center 204. The web server (e.g., web server 214 and/or UMS 216) is coupled to a PBX system 208 of the office. In this sense, the mobile worker can "view" voice mail messages left on the office's voice mail system preferably over a secure web page.

In fact, the mobile worker can control and operate a keyset in functionally the same manner from a remote client as from a workstation.

Figure 3A:
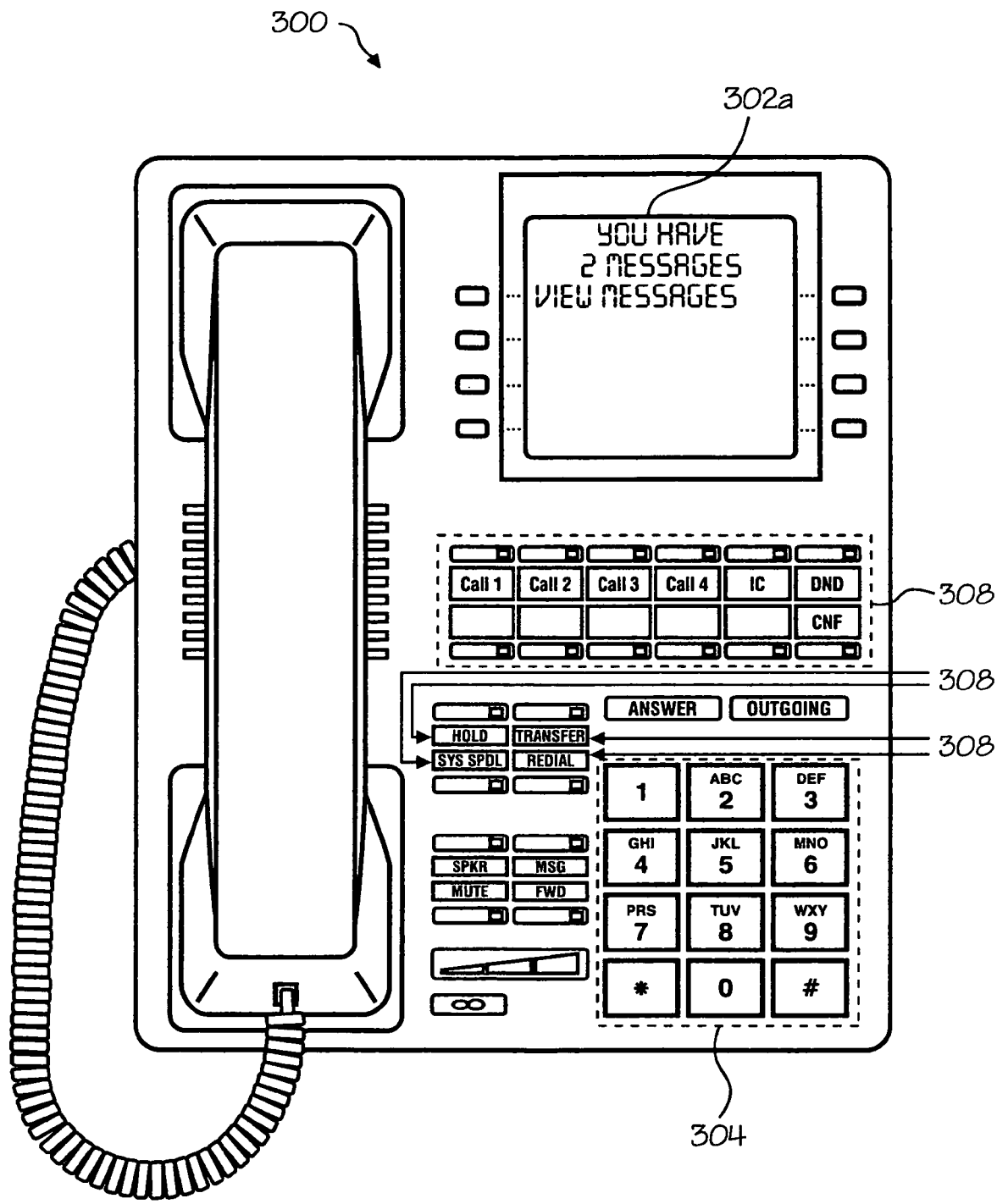
FIGS. 3a and 3b illustrate an exemplary keyset in accordance with the present invention.
Figure 3B:
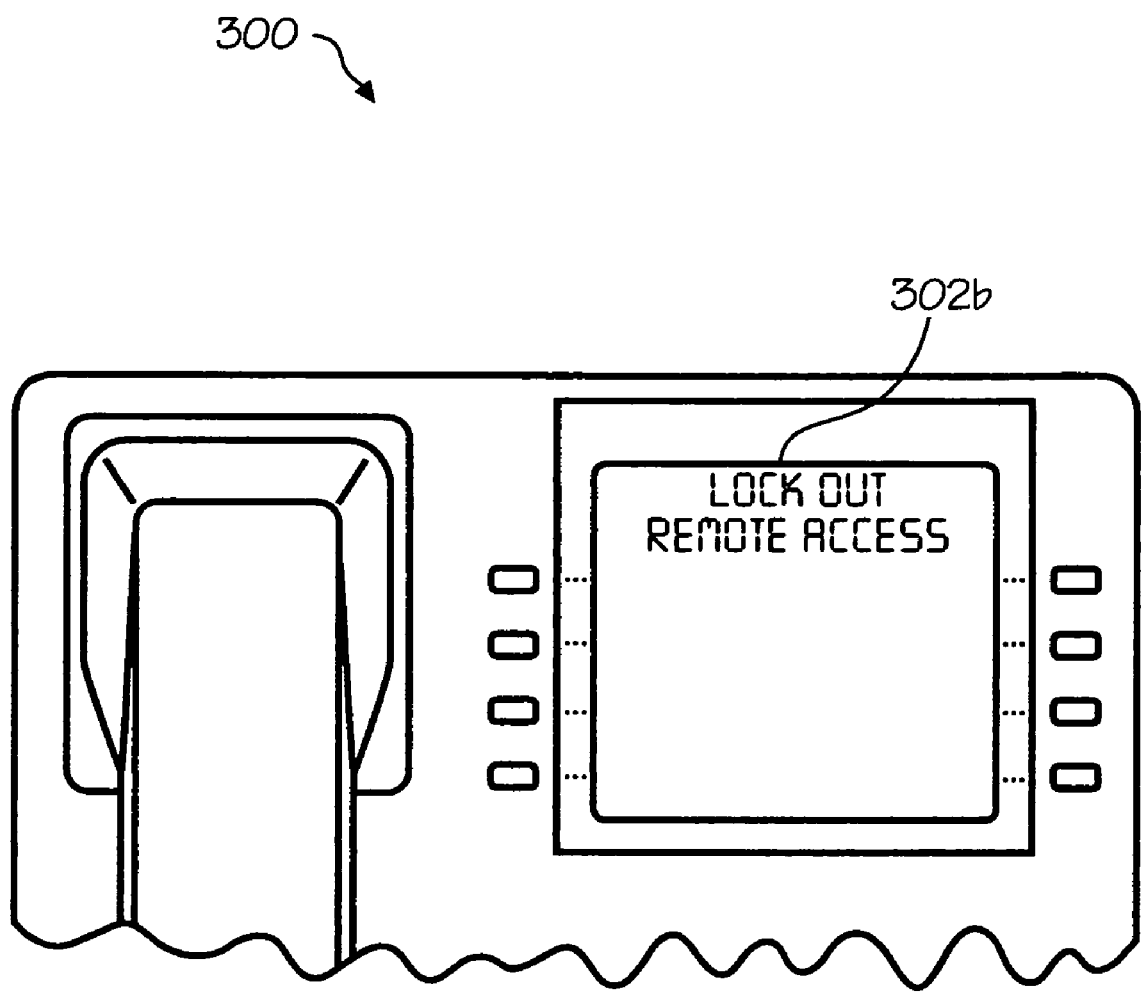

FIGS. 3a and 3b illustrate a keyset 300 having a display 302, keypad 304 and function keys 308. Keyset 300 is preferably of the type having hardware and software configured to permit multiple function capabilities. For example, function keys 308, when depressed, may activate hardware of keyset 300 and/or software suitably linked to keyset 300 causing various desktop-related functions to occur. Typical features conventionally available on desktop keysets include call forwarding, Do-Not-Disturb, conferencing, call waiting, hold, transfer, mute message indicator, and other features that may be activated by menu soft keys associated with a phone system, display and/or keyset. In addition, each function key 308 may include a matching indicator light that illuminates upon activation of the associated function key (each indicator light is shown directly above or below the corresponding function key on FIG. 3a).

Display 302 permits the user to visually read the operations associated with function keys 308. In addition, in combination and/or conjunction with a messaging system, e.g., UMS 216, display 302 of keyset 300 visually displays data pertaining to stored voice mail messages. As shown in exemplary display 302a of FIG. 3a, keyset 300 has received 2 voice mail messages. The user may view the messages, or perform various other functions, by activating (e.g., depressing) the function keys located near display 302a. For example, the caller, may select "VIEW Messages" (or the equivalent) to scroll through the stored messages and choose a message to listen to. In other words, the user may skip over the first voice mail message and listen to the second message. The first message may be retained in the voice mail system and listened to at a later time. Alternatively, the user may activate one or more of the function keys and, for example, select to forward the first message to another extension, delete the message or return a call.

Figure 6:
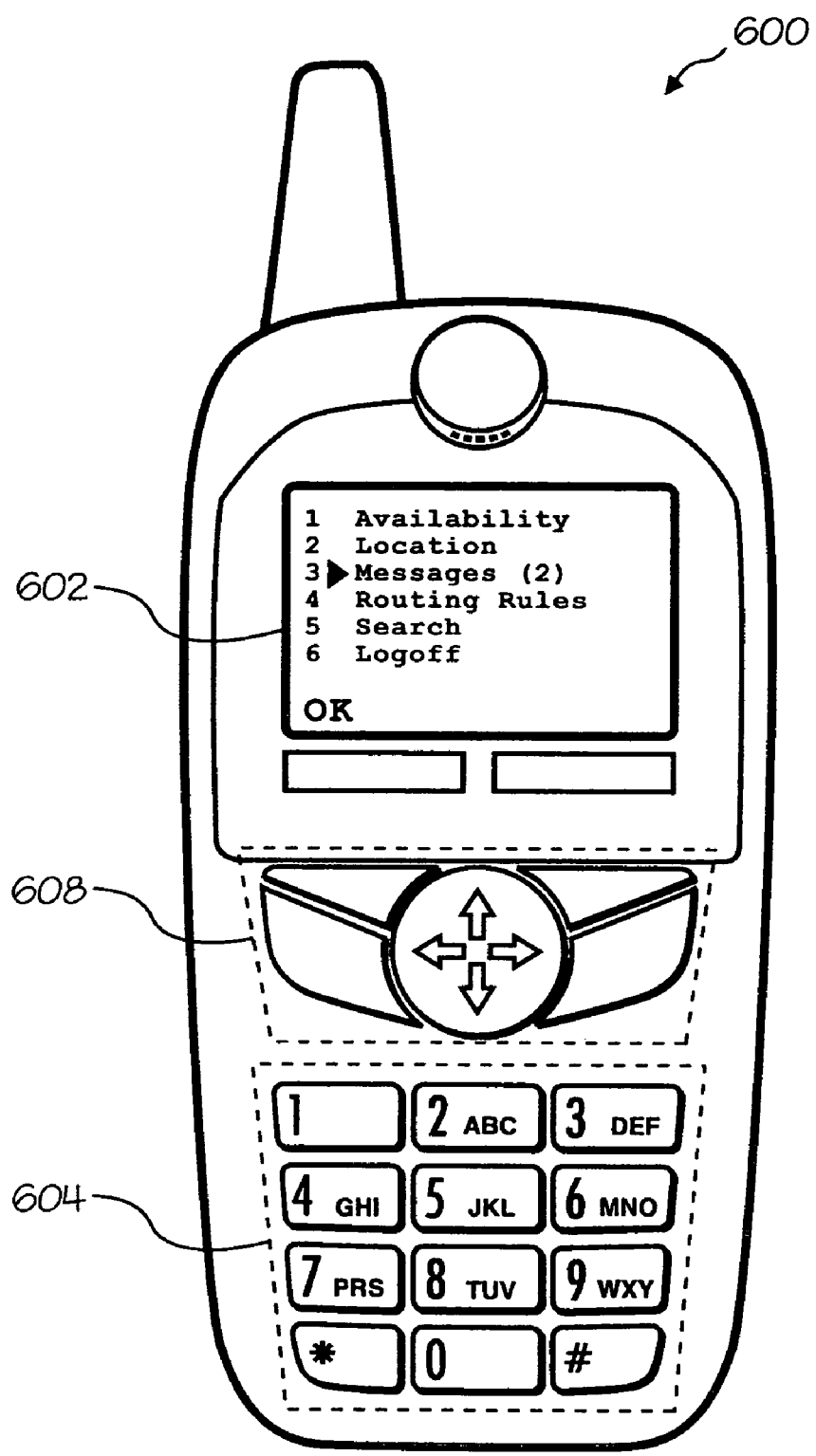
FIG. 6 illustrates an exemplary remote client in accordance with the present invention.

FIG. 6 illustrates an exemplary remote client 600 having a display 602, keypad 604 and function keys 608. As shown, remote client 600 is a hand-held cellular telephone; however, it should be appreciated that FIG. 6 and remote client 600 are not intended to be limiting on the type, function or style of remote clients. Rather, the present figure and remote client are provided merely as exemplary embodiments to facilitate understanding of the present invention. As is common with conventional high-tech communication devices, remote client 600 preferably includes programmable function keys 608. These keys may be programmed by the mobile user to activate various operations of the remote client or while the remote client is connected to the Internet. For example, one such function key be programmed as a "scroll down" or "arrow" key while another key may be depressed to indicate the mobile user wishes to "select" a displayed item.

With continued reference to FIG. 6 and remote client 600, display 602 of the exemplary remote device, in conjunction with the present invention, shows the mobile user that two voice mail messages have been received by an appropriate voice mail system and are readily accessible to the user. In the preferred embodiment, the mobile user accesses a web page stored on a web server of the office, using the remote device, which in turn links the user to messaging system of the office. In this sense, the mobile user may "view" stored voice messages on the remote device in a similar manner as if the user was viewing a keyset stationed in the office. For example, substantially the exact same data and functions available to the user on keyset 300 (FIG. 3) are equally viewable, operable and available to the user on a remote client, e.g., remote client 600. Thus, using function keys 608 the mobile user may scroll past the first stored voice message and listen only to the message, if any, that the user desires to hear, e.g., the second voice message. Alternatively, in a similar manner as previously described for keyset 300, the user may activate one or more of the function keys and, for example, select to forward the first message to another extension, delete the message or return the call. In this sense, updated visual information is transmitted to the remote client on the same data stream, albeit logically separated from voice information, from the office information center. The information is displayed on the remote client to show the status of the corresponding keyset display. In fact, function keys and their matching indicator lights may also be displayed on the remote client to show the status indications as if the user were actually in the office and viewing the display of a desktop keyset.

As shown FIG. 6 and display 602, various other functions may be displayed to the mobile user. Using function keys 608, the user can scroll through the options (e.g., an arrow may appear next to the available function) and select which option the user desires. While merely exemplary and provided for illustrative purposes only, display 602 offers the user voice message and web-related choices such as, "SEARCH" and "LOGOFF".

FIG. 3b illustrates one particular embodiment of the present invention which provides a "lock out" feature as displayed on exemplary display 302b. Once remote access has been established between a remote client (e.g., remote client 600) and a keyset (e.g., keyset 300), the present embodiment of the system opens a session to the keyset and places the keyset in a special mode that disables the keyset's system connection. This effectively "locks out" the keyset from performing any further functions within the system and extends all system control to the connected remote client. Preferably, an indication of the "locked" state is displayed on the office keyset to alert personnel in the office that the keyset is unavailable and being controlled from a remote device. For example, an exemplary display such as display 302b, "- - - LOCK OUT- - - REMOTE ACCESS", may post on the keyset display. As long as the remote client maintains an active connection with the office, the desktop keyset remains inoperable. Once the remote client discontinues connection with the office, for example, by skipping to another hyperlink or logging out of the corporate system entirely, the desktop keyset returns to the previous unlocked state and resumes normal updates from the PBX system.

In another embodiment of the invention, the mobile user may participate in a high-quality audio conference call by using the tele-conference resources available at their office to establish a multi-party conference with a remote device. In this case, the remote device controls the "set up" and "tear down" of the conference. The office system (e.g., PBX system) is used to enhance the quality of the conference by bridging together the participants using a high-quality audio mixing device that is not available at remote locations.

In yet another embodiment of the invention, a higher bandwidth mode may be used in the communication link between the remote client and the office to process video calls. This may be accomplished by routing video information from the office phone system over the web server and to the remote device's display and audio facilities using substantially the same techniques described for a high-quality audio conference call, but adapted to video transmission.

In the case where the remote device is not capable of transmitting an audio or visual signal digitally (such as speech-to-text conversion), one embodiment may involve the mobile user listening, reading (via speech recognition), and manipulating voice messages that may be stored back at the office. This allows the user to review messages and forego the actual replies until a later time.

Remote Access Exemplary Flowchart

The various operations of the present invention will now be discussed to further facilitate understanding of the invention and its best mode. It should be appreciated that the particular implementations shown and described are illustrative of embodiments of the invention (including its best mode) and are not intended to limit the scope of the present invention in any way.

Figure 7:
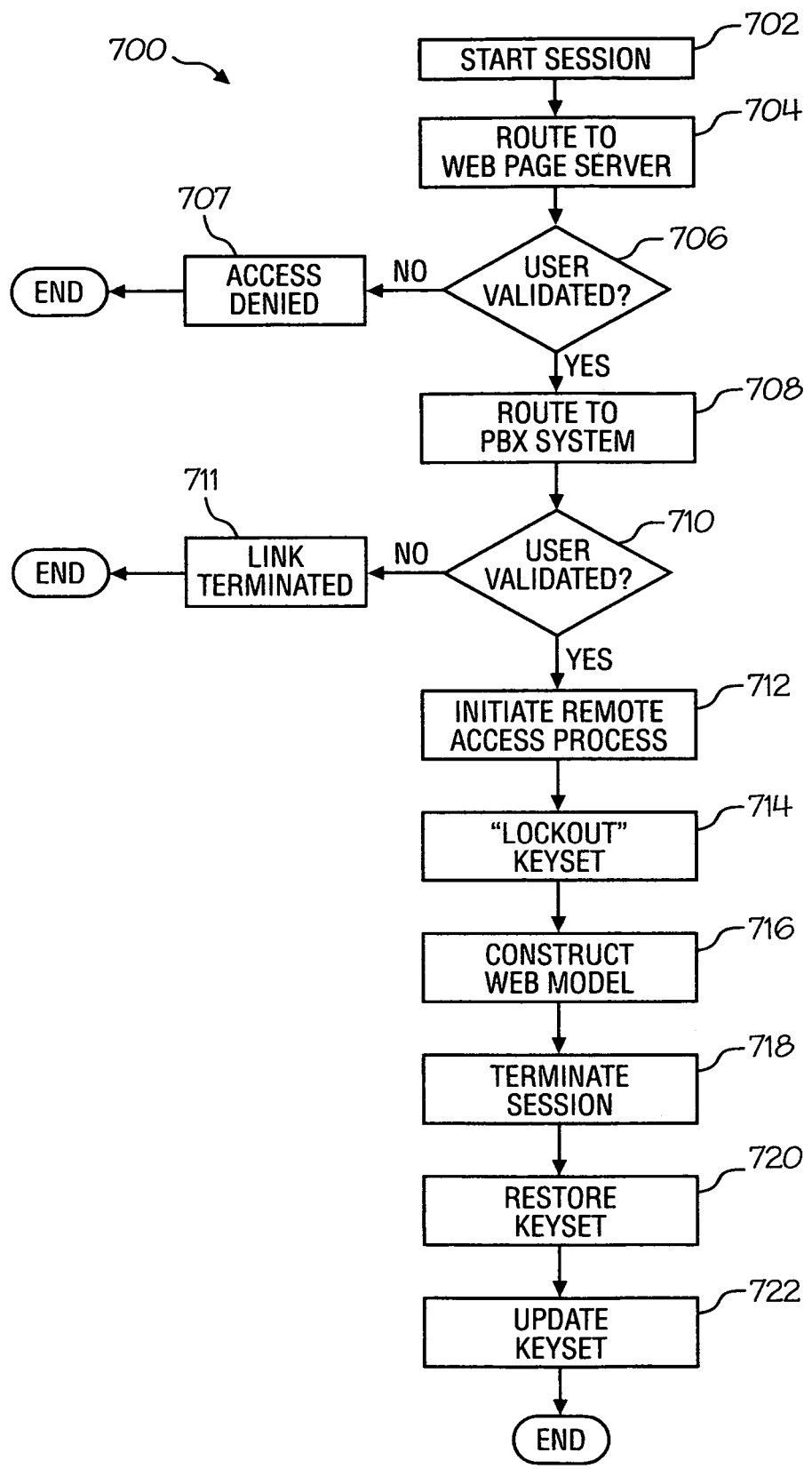
FIG. 7 is an exemplary flowchart for remote access in accordance with the present invention.

FIG. 7 is a flowchart 700 describing an exemplary embodiment for remote access to an office in accordance with the present invention. For ease of understanding, flowchart 700 is conveniently illustrated and described with the communication channel between a remote client and the office being the Internet, i.e., connection via the world wide web. Therefore, reference is made herein to systems and methods relating to a web-based embodiment and web-compliant remote devices. However, it should be appreciated that various other communication channels and remote devices are within the scope of the invention, such as previously described remote device 203 via an on-premise wireless gateway.

The mobile user begins a session with the office using an appropriately equipped remote device (step 702). Preferably, the remote device includes a web-compliant device having a web service translator (i.e., WAP) or the equivalent to establish a connection with the Internet. The web service translator typically includes programming to perform the necessary translation to support web browsing on the remote device. The translation is often times needed due to the limited size of some remote device displays and the limited number of keys available on the device. Once the interface to the cell phone has been translated, the translation server sets up a user appearance on the Internet that appears in all aspects like a standard PC with browser-capabilities accessing the web. This server is actually a conglomeration of processes capable of handling a plurality of remote device browser sessions at the same time. These sessions provide independent Internet accessibility for a plurality of mobile users.

Once the link between the remote device and the Internet is established, the mobile user can direct, or be directed, to a web page, such as a corporate web page (step 704). In some aspects, one particular embodiment of the present invention may rely on and utilize existing computer security systems to validate the remote user (step 706). If the user is not validated, access may be denied (step 707). Once the user has been validated, selected corporate resources may be made available. For example, the mobile user can select or be directed to a web page containing data pertaining to their personal messaging system. Once connected to the web page server (either a stand alone web page server or the Unified Messaging Server), the system may examine the data present in the cookie (or equivalent means for providing an association) left in the remote browser's file reference. From this cookie the user name is translated into a port address in the PBX system (step 708). The user may again be authenticated (step 710) and if the user is not found on the PBX system the link may be terminated (step 711) with an error message transmitted to the user. If the user is authenticated or validated, e.g., by name, or similar identification information matched against a remote access list, the PBX system begins the remote access process (step 712).

In one particular embodiment, the mobile user may program a suitable function key on the remote device to correspond to the corporate web page, message web page, or the like. For instance, a "favorites" key on the remote device may be activated to connect the remote device to the mobile user's message web page. In this manner, the previous steps of routing and validation would occur virtually transparent to the mobile user.

When the remote user selects a designated portion of a web page, such as choosing to communicate with the Unified Messaging Server, the system establishes a bi-directional path for either compressed or non-compressed data transmission. The PBX system receives a command that a remote user is taking control of the desktop and checks the desktop to make sure it's idle (not in use). In one particular embodiment, the system "locks out" the desktop (step 714) and may cause a message to display on the keyset indicating the new mode. The PBX extends command control of the port to the remote user.

A web server constructs a web page model mimicking the current state of the mobile user's desktop (step 716). In addition, during the setup of the session, the application software performs an inquiry that determines the type of remote client and alters the web presentation (e.g., HTML or WML markup) accordingly. This page is presented as a dynamic web page to show updated keyset displays and light indications. Audio signals may be processed separately, either by physical or logical channel. As previously mentioned, channels may be used to process voice mail messages within the system and may also be used to remotely conduct live voice communications. As long as the remote user remains connected, all incoming calls are automatically indicated on the remote web browser's display. Voice communications to a remote personal computer desktop may either be in a separate call to a telephone on the premises or in packet form within an IP stream to a sound card or other audio device installed with the PC. When a selection is made appropriate with answering the call, the remote user is given access to the appropriate audio connection and may talk to any calling party who is trying to reach the remote user. In effect the web model of the local keyset is extended remotely for any length of time as required by the remote user. When the call is terminated the status of the web page is dynamically updated.

The remote user may retrieve any voice mail or station-specific messages just as if they were at the office. Messages may be viewed by selecting the appropriate selection or function key. During idle times, the remote device may display or otherwise indicate the idle status.

When the remote session is no longer required, the user either terminates the session entirely (e.g., selects "LOGOUT" or a similar function) or skips to another website via the web browser. Once this has occurred, the system terminates the session (step 718) and restores the conjoined local keyset to its original state (step 720). This step may include restoring the keyset port to the previous state and/or taking into account any updates that may have been made to the keyset during the remote session (step 722).

Access to Office Workstation on Point-To-Point Basis

In another system and method of the invention, the office telephone and remote client may be communicating on a point-to-point basis. The remote client is not required to access the PBX system (e.g., PBX system 208) in order to conduct the remote session. Rather, a point-to-point communication between the remote client and the office is established and the PBX system is not directly involved with the remote access session.

Referring again to FIG. 2, in one particular embodiment, the mobile worker using a suitable remote client accesses the Internet, VoIP, or other packet-based network in a variety of methods which are beyond the scope of this disclosure. In a point-to-point access system, the "remote client" may include any of the previously discussed remote devices (e.g., remote client 201), as well as hybrid-type communication devices that may include both PSTN and IP capabilities.

The remote client accesses office information center 204 at web server 214. Although depicted on FIG. 2 as a separate blocks, it should be appreciated that web server 214 may be integrated within office workstation 210 or directly coupled thereto. For example, office workstations 210 may include web services within the devices itself. The functionality of the desktop telephone (e.g., workstation 210) is accessible to the remote client via a web service within the office workstation. Because the events occurring at the office location are dynamic in nature, the internally contained web service constantly reflects the changes in the office workstation's operational state. As previously mentioned in other embodiments, the remote access may be authenticated by web server 214 to ensure only authorized connections and persons are able to access the workstation.

The network protocol is established on a point-to-point basis between the remote client and the office workstation or device. Access through the PBX system is no longer needed in order to carry-on the remote access session. The PBX system (e.g., PBX system 208) continues to direct communication events to office workstation 210 as if no remote access session was occurring. The office workstation simply flows these events to the remote client via the point-to-point connection. Thus, the mobile worker is able to see, control and operate the office workstation via the web interface technology of the office workstation as if the worker were physically in the office. The office web services may be coupled to the visual and audio information that is present in the office workstation and that information can be passed to the remote client.

PBX system 208 receives incoming calls for the office workstation and forwards calls and various other events to the office workstation. In the point-to-point embodiments, the PBX system continues to function in a normal manner and processes all calls and events for the office workstation as if the remote session were not taking place. As long as the remote session remains active, all incoming calls and events to the office workstation are recognized on the remote client's web browser's dynamic model. When a selection is made appropriate with answering a call, the remote user accesses the active audio connection and may talk to any calling party. When a call is terminated, the status of the web page is dynamically updated and the mobile worker is able to view an idle desktop.

In one aspect of the embodiments, the remote client accesses a dynamic web page as previously discussed to initiate a remote access session with the office information center. An authentication process may occur to ensure a secure session. Regardless of access point, e.g., through the PBX system or on a point-to-point basis, the connection to the web services may trigger a notification to the PBX system that a remote access session has been initiated. The PBX may launch or cause the launch of an application to monitor the session. For example, a log may be kept to store the length of the remote session may be timed, for example for billing purposes, security, and/or the location of the remote access point may be determined, for example to cross-check authentication.

In one embodiment, the establishment of the remote session between the remote client and the office workstation triggers a "lockout" function of the office workstation or desktop keyset. In a similar manner as previously described, the desktop keyset is rendered inoperable during the remote session. Alternatively, the two devices may remain operational such that events or alterations made at one location are immediately recognized at the other location.

Access to Remote Client On Point-To-Point Basis

In yet another point-to-point embodiment, instead of the mobile worker accessing the office via the remote client, the worker may desire to access the remote client via the office workstation. In this embodiment, the office workstation (e.g., workstation 210) simulates a web browsing client and the remote client acts in a web servicing capacity. In a similar manner as the previous point-to-point embodiment, the access session is between the two devices and not through the PBX system. The remote client web services are coupled to the visual and audio information that are present in the remote client and that information is passed to the office workstation.

The remote client may be coupled to a smaller customer-owned switching system than perhaps the office. Thus, the feature content of the office desktop may be reduced. To accommodate this, the remote client's functions may be contained within a special graphical window that may be opened full size, in a reduced size, or on a toggled basis with the default display on the office workstation. This may allow a dual-control capability to be set up to handle events from two switching systems simultaneously.

The remote client may include or be coupled to various connectivity devices (not shown). The connectivity devices may include phantom extensions and phones, remote clients, computing devices or special devices providing any data, images, audio and/or video media (e.g., surveillance systems). Phantom extensions may be coupled to the remote client containing software features manageable from the remote client and/or the office. During the point-to-point remote session, the office workstation can receive information from the connectivity devices via the remote client. Control may continue on a point-to-point basis, or the media may pass through the remote client to minimize real time processor impacts to the client. A worker may be able to access, control, monitor and view connectivity devices located in a remote location through the remote access session to the remote client as if the worker were controlling the devices from the remote location. In one particular embodiment, access to the connectivity devices may be setup as command button images that are visible from the office workstation. When selected, commands are sent to the remote client to retrieve information from or open a communication channel between the connectivity devices.

In one particular embodiment, the remote access session may cause the remote client to "lock out" as previously discussed. Thus, the remote is not capable of operation on its own during the session.

In another embodiment of the point-to-point remote access system, once a remote session is established, from the remote client to the office workstation or vice versa, calls made by the worker at his location may include the caller-ID from the accessed system. For example, if a worker is located remotely and has successfully established a remote session with the office workstation, then calls made from the remote client may conveniently include the office workstation caller-ID. This is especially useful for mobile workers and telecommuters such that call recipients are correctly notified about the communication's source.

In a similar manner and another embodiment, incoming communications to the mobile user may be answered at the remote location with the correct caller-ID of the calling source appearing on the display of the remote client. This occurs without any additional routing or operations from the office PBX system.

Alternatively, in a remote access session between the office workstation, the remote client and a connectivity device (e.g., another remote device), calls made from the connectivity device may include the caller-ID from the connectivity device, the remote client, the office workstation or any combination of the three or more devices.

In still another embodiment of a point-to-point remote access system, a plurality of remote clients may concurrently access the office workstation with each connection being a point-to-point establishment to the office workstation. This may be particularly useful if the mobile user has multiple remote devices. Conversely, a plurality of office workstations may concurrently access a remote device.

The office workstation may be coupled to one or more connectivity devices as previously discussed. In this manner, a remote access session between the remote client and the office workstation may permit the remote worker to access, view, control and manage additional devices coupled to the workstation from the remote location.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The invention claimed is:

1. A system for establishing a remote access session to a telephone, the system comprising:
   a communication device having a display, an input mechanism and a web browser, the communication device in a location remote from the telephone;
   an information center comprising;
   a private branch exchange (PBX) system providing delivery of external and internal telephone calls and messaging to and from the information center; and
   the telephone having a web server integrated therein to provide a dynamic web-based graphical user interface (GUI) accessible by the communication device, the telephone coupled to the local area network and the PBX system, the telephone receives, from the PBX system, an information indicative of a communication event; and
   a web-based communication channel coupling the communication device and the information center to cause the remote access session,
   whereby, the communication device initiates the session by accessing the dynamic web-based GUI and during the session, the communication device receives and displays the information indicative of the communication event on a point-to-point basis from the telephone via the dynamic web-based GUI, thereby transferring complete management functions of the information indicative of the event to the communication device.

2. The system for establishing the remote access of claim 1, wherein during the session the telephone is inoperable.

3. The system for establishing the remote access of claim 1, wherein the information indicative of the communication event comprises real-time life communication.

4. The system for establishing the remote access of claim 1, wherein the information indicative of the communication event comprises a voicemail message.

5. The system for establishing the remote access of claim 4, wherein the information comprises data to display the voicemail message on the display of the communication device.

6. The system for establishing the remote access of claim 1 further comprising a second communication device coupled to other communication device whereby the second communication device receives and displays the information indicative of the communication event.

7. The system for establishing the remote access of claim 1, wherein the communication device comprises both PSTN and IP capabilities.

8. The system for establishing the remote access of claim 1, wherein during the session, the communication device initiates a second communication event that is received at the telephone and processed through the PBX system of the information center.

9. The system for establishing the remote access of claim 8, wherein the second communication event comprises a real-time live communication.

10. The system for establishing the remote access of claim 9, wherein the second event comprises a caller-ID assigned to the telephone.

11. A system for remote access to a telephone, the system comprising:
   a communication device having a display, an input mechanism and a web browser, the communication device in a location remote from the telephone;
   an information center comprising;
   a private branch exchange (PBX) system providing delivery of a plurality of external and internal communication events to and from the information center; and
   the telephone coupled to the PBX system and receiving the communication events, the telephone having a web server integrated therein to provide a dynamic web-based graphical user interface (GUI) accessible by the communication device; and
   a web-based communication channel coupling the communication device and the information center for a remote access session,
   whereby, the communication device initiates the remote access session by accessing the dynamic web-based GUI and during the session the communication device receives and displays the communication events thereby transferring complete management functions of the communication events to the communication device, and the PBX system is notified of the remote access session and launches a monitoring log.

12. The system of claim 11, wherein the monitoring log comprises the length of the remote.

13. The system of claim 11, wherein the session comprises a point-to-point connection between the communication device and the telephone.

* * * * *